(12) United States Patent
Stojanovic

(10) Patent No.: US 9,906,307 B2
(45) Date of Patent: Feb. 27, 2018

(54) APPARATUS FOR CHARACTERIZING A CHROMATIC DISPERSION OF AN OPTICAL RECEIVE SIGNAL

(71) Applicant: Huawei Technologies Co., Ltd., Shenzhen, Guangdong (CN)

(72) Inventor: Nebojsa Stojanovic, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/094,117

(22) Filed: Apr. 8, 2016

(65) Prior Publication Data

US 2016/0226596 A1    Aug. 4, 2016

Related U.S. Application Data

(63) Continuation of application No. PCT/EP2013/071084, filed on Oct. 9, 2013.

(51) Int. Cl.
*H04B 10/61* (2013.01)
*H04B 10/079* (2013.01)

(52) U.S. Cl.
CPC ... *H04B 10/6161* (2013.01); *H04B 10/07951* (2013.01)

(58) Field of Classification Search
CPC combination set(s) only.
See application file for complete search history.

(56) References Cited

U.S. PATENT DOCUMENTS

| | | | |
|---|---|---|---|
| 4,556,314 A | 12/1985 | Stone | |
| 2005/0110981 A1 | 5/2005 | Hayashi et al. | |
| 2010/0142946 A1 | 6/2010 | Liu et al. | |
| 2011/0200339 A1* | 8/2011 | Komaki | H04B 10/61 398/208 |
| 2012/0033965 A1* | 2/2012 | Zhang | H04B 10/611 398/38 |
| 2012/0128376 A1* | 5/2012 | Sun | H04B 10/6161 398/208 |
| 2012/0213512 A1 | 8/2012 | Stojanovic | |

(Continued)

FOREIGN PATENT DOCUMENTS

| | | |
|---|---|---|
| CN | 101753217 A | 6/2010 |
| JP | 2008241443 A | 10/2008 |

OTHER PUBLICATIONS

F.N. Hauske et al., "Precise, Robust and Least Complexity CD estimation", Optical Society of America, 2011, 3 pages.

(Continued)

*Primary Examiner* — David Payne
*Assistant Examiner* — Omar S Ismail

(57) ABSTRACT

The invention relates to an apparatus for characterizing a chromatic dispersion of an optical receive signal, the apparatus comprising a delay means for delaying the optical receive signal by a predetermined time delay to obtain a delayed signal, the delayed signal being delayed with respect to the optical receive signal, a phase detecting means for determining a first value indicating a phase delay of the optical receive signal, and for determining a second value indicating a phase delay of the delayed signal, and a processor for determining a chromatic dispersion indicator upon the basis of the first value and the second value, the chromatic dispersion indicator characterizing the chromatic dispersion.

14 Claims, 22 Drawing Sheets

(56) References Cited

U.S. PATENT DOCUMENTS

2012/0219302 A1* 8/2012 Sun .................... H04B 10/6161
398/208
2012/0308234 A1* 12/2012 Bianciotto ........... H04B 10/614
398/65

OTHER PUBLICATIONS

Leonard G. Cohen, "Comparison of Single-Mode Fiber Dispersion Measurement Techniques", Journal of Lightwave Technology, vol. LT-3, No. 3, Oct. 1985, p. 958-966.
Chongjin Xie.,"Chromatic Dispersion Estimation for Single-Carrier Coherent Optical Communications", IEEE Photonics Technology Letters, vol. 25, No. 10, May 15, 2013, 4 pages.

* cited by examiner

APPARATUS FOR CHARACTERIZING A CHROMATIC DISPERSION OF AN OPTICAL RECEIVE SIGNAL

CROSS-REFERENCE TO RELATED APPLICATIONS

This application is a continuation of International Application No. PCT/EP2013/071084, filed Oct. 9, 2013, which is hereby incorporated by reference in its entirety.

TECHNICAL FIELD

The invention relates to the field of chromatic dispersion characterization in optical communication receivers.

BACKGROUND

Optical communication systems are widely used for high capacity data transmission over short and long distances. Currently, simple binary modulation formats, such as on-off keying encoding one bit per symbol, are mostly used (e.g., in 10 Gb/s data transmission systems).

New generations of high capacity optical communication systems are designed to employ advanced modulation formats, such as quadrature amplitude modulation, in combination with polarization multiplexing and coherent detection. This way, a higher capacity data transmission (e.g., 100 Gb/s) and a higher spectral efficiency can be achieved.

For data recovery in coherent optical communication receivers, the characterization of the chromatic dispersion (CD) of the optical receive signal is important. When the chromatic dispersion is characterized, the optical communication receiver can compensate the chromatic dispersion using digital signal processing techniques.

However, there exists no efficient approach for characterizing the chromatic dispersion of an optical receive signal for a variety of different modulation formats, multiplexing schemes and/or detection schemes.

Furthermore, an efficient characterization of the chromatic dispersion in extremely bandlimited systems, such as Nyquist systems with small roll-off factors or faster than Nyquist systems, is challenging.

In F. N. Hauske, Z. Zhang, C. Li, C. Xie, Q. Xiong, "Precise, Robust and Least Complexity CD estimation", in Proc. OFC, Los Angeles, USA, 2011, Paper JWA32, a chromatic dispersion estimation approach is described. The estimation approach is suitable for non-bandlimited systems.

SUMMARY

It is the object of the invention to provide an apparatus for efficiently characterizing the chromatic dispersion of an optical receive signal.

This object is achieved by the features of the independent claims. Further implementation forms are apparent from the dependent claims, the description and the figures.

The invention is based on the finding that a phase delay of an optical receive signal and a phase delay of a delayed signal can be evaluated.

According to a first aspect, the invention relates to an apparatus for characterizing a chromatic dispersion of an optical receive signal, the apparatus comprising a delay means for delaying the optical receive signal by a predetermined time delay to obtain a delayed signal, the delayed signal being delayed with respect to the optical receive signal, a phase detecting means for determining a first value indicating a phase delay of the optical receive signal, and for determining a second value indicating a phase delay of the delayed signal, and a processor for determining a chromatic dispersion indicator upon the basis of the first value and the second value, the chromatic dispersion indicator characterizing the chromatic dispersion. Thus, the chromatic dispersion of an optical receive signal can be characterized efficiently.

The optical receive signal can be converted to an electrical signal, e.g., by an optical front end. The optical receive signal can be a complex signal comprising an in-phase (I) and a quadrature (Q) component. The optical receive signal can be sampled and/or quantized.

The delayed signal can be a complex signal comprising an in-phase (I) and a quadrature (Q) component. The delayed signal can be sampled and/or quantized.

The predetermined time delay can be, for example, 1 ps, 10 ps, or 100 ps.

The phase delay of the optical receive signal can relate to a sampling phase of the optical receive signal. The first value can be a real number (e.g., 1.3) or a complex number (e.g., 1+j).

The phase delay of the delayed signal can relate to a sampling phase of the delayed signal. The second value can be a real number (e.g., 0.8) or a complex number (e.g., 4−2j).

The chromatic dispersion can relate to a wavelength-dependent propagation of an optical signal in an optical waveguide. The chromatic dispersion indicator can be a real number (e.g., 2.5).

In a first implementation form according to the first aspect as such, the phase detecting means comprises a first phase detector being configured to determine the first value indicating the phase delay of the optical receive signal, and a second phase detector being configured to determine the second value indicating the phase delay of the delayed signal. Thus, the phase detecting means can be implemented efficiently.

The first phase detector and the second phase detector can be characterized by a characteristic curve, e.g., an S-curve.

In a second implementation form according to the first aspect as such or any one of the preceding implementation forms of the first aspect, the optical receive signal comprises communication symbols, and the communication symbols are oversampled by a predetermined oversampling factor. Thus, the processing of the optical receive signal can be simplified.

The communication symbols can be characterized by a modulation format (e.g., QPSK or 16QAM). The communication symbols can further be characterized by a pulse shape, e.g., a cosine roll-off pulse shape.

The oversampling factor can relate to the number of samples per communication symbol. The oversampling factor can be a natural number (e.g., 2) or a real number (e.g., 1.5).

In a third implementation form according to the first aspect as such or any one of the preceding implementation forms of the first aspect, the optical receive signal comprises communication symbols, and the delay means is configured to delay the optical receive signal by a fraction, in particular by $\frac{1}{4}^{th}$, of a communication symbol time. Thus, a desired relative sampling phase between the optical receive signal and the delayed signal can be realized.

The communication symbol time can correspond to the nominal length of a communication symbol in time. The communication symbol time can further correspond to an inverse of a communication symbol rate. The communication symbol time can be, for example, 10 ps or 100 ps.

In a fourth implementation form according to the first aspect as such or any one of the preceding implementation forms of the first aspect, the optical receive signal comprises communication symbols, and the delay means comprises a delay unit being configured to delay the optical receive signal by a half of a communication symbol time to obtain an auxiliary signal, and an adder being configured to add the auxiliary signal to the optical receive signal to obtain the delayed signal, the delayed signal being delayed by $\frac{1}{4}^{th}$ of the communication symbol time. Thus, a relative sampling phase between the optical receive signal and the delayed signal of 90° can be approximated by interpolation.

The auxiliary signal can be a complex signal comprising an in-phase (I) and a quadrature (Q) component. The auxiliary signal can be sampled and/or quantized.

In a fifth implementation form according to the first aspect as such or any one of the preceding implementation forms of the first aspect, the phase detecting means is configured to widen the spectrum of the optical receive signal or the delayed signal. Thus, an influence of a pulse shape of the optical receive signal or the delayed signal can be minimized.

The spectrum can relate to a baseband frequency spectrum of the optical receive signal or the delayed signal. The spectrum can further relate to a magnitude spectrum.

The widening of the spectrum can introduce excess frequency components to the optical receive signal or the delayed signal.

In a sixth implementation form according to the fifth implementation form of the first aspect, the phase detecting means is configured to widen the spectrum of the optical receive signal or the delayed signal according to the following equation:

$$y = x(n)x^*(n-1)$$

wherein x denotes the optical receive signal or the delayed signal in time domain, n denotes a sample index, (*) denotes complex conjugate, and y denotes the spectrum widened signal. Thus, the spectrum of the optical receive signal or the delayed signal can be widened efficiently.

In a seventh implementation form according to the first aspect as such or any one of the preceding implementation forms of the first aspect, the phase detecting means is configured to recover a sampling phase of the optical receive signal or of the delayed signal to determine the first value or the second value. Thus, the first value or the second value can be derived from the recovered sampling phase of the optical receive signal or of the delayed signal.

The sampling phase of the optical receive signal or of the delayed signal can relate to a sampling instant within a communication symbol. The sampling phase can be, for example, 0°, 5°, 10°, 30°, 90°, 180°, 270°, or 360°.

The first value can be determined from the recovered sampling phase of the optical receive signal by a mathematical relationship. The second value can be determined from the recovered sampling phase of the delayed signal by a further mathematical relationship.

The mathematical relationship and/or the further mathematical relationship can be defined by a characteristic curve of a phase detector, e.g., an S-curve.

In an eighth implementation form according to the seventh implementation form of the first aspect, the phase detecting means is configured to determine the first value or the second value according to the following equation:

$$y = \text{real}(x(n)^*(x(n+1) - x(n-1)))$$

wherein x denotes the optical receive signal or the delayed signal in time domain, n denotes a sample index, (*) denotes complex conjugate, real(•) denotes the real part of a complex number, and y denotes the first value or the second value. Thus, the first value or the second value can be determined efficiently.

In a ninth implementation form according to the first aspect as such or any one of the preceding implementation forms of the first aspect, the processor is configured to weight the first value or the second value by a predetermined weighting factor. Thus, the influence of the first value or the second value on the chromatic dispersion indicator can be adjusted.

The weighing factor can be a real number (e.g., 0.3).

In a tenth implementation form according to the ninth implementation form of the first aspect, the processor is configured to weight the first value or the second value by a predetermined weighting factor g given by:

$$g = \frac{1}{8}\sqrt{\frac{\pi}{2+\pi}}$$

Thus, a particular weighting factor suitable for different implementations can be employed.

In an eleventh implementation form according to the first aspect as such or any one of the preceding implementation forms of the first aspect, the processor comprises a low-pass filter, and the processor is configured to provide the first value or the second value to the low-pass filter. Thus, a smoothing by the low-pass filter can be achieved.

The low-pass filter can be realized as a finite impulse response (FIR) filter or an infinite impulse response (IIR) filter. The low-pass filter can be configured to yield a moving average.

In a twelfth implementation form according to the eleventh implementation form of the first aspect, the processor comprises a low-pass filter, the processor is configured to provide the first value or the second value to the low-pass filter, and the low-pass filter is an integrator or a weighted integrator. Thus, the low-pass filter can be implemented efficiently.

The integrator can be configured to accumulate a current value and a previous value.

The weighted integrator can be configured to accumulate a current value and a previous value, wherein the current value and the previous value can be weighted by attenuation factors.

In a thirteenth implementation form according to the first aspect as such or any one of the preceding implementation forms of the first aspect, the processor is configured to determine the chromatic dispersion indicator according to the following equation:

$$W = W_1^2 + W_2^2$$

wherein $W_1$ denotes the first value, $W_2$ denotes the second value, and W denotes the chromatic dispersion indicator. Thus, the chromatic dispersion indicator can be determined efficiently.

According to a second aspect, the invention relates to a method for characterizing a chromatic dispersion of an optical receive signal, the method comprising delaying the optical receive signal by a predetermined time delay to obtain a delayed signal, the delayed signal being delayed with respect to the optical receive signal, determining a first value indicating a phase delay of the optical receive signal, determining a second value indicating a phase delay of the delayed signal, and determining a chromatic dispersion indicator upon the basis of the first value and the second value, the chromatic dispersion indicator characterizing the chromatic dispersion. Thus, the chromatic dispersion of an optical receive signal can be characterized efficiently.

Further features of the method can directly result from the functionality of the apparatus according to the first aspect as such or any one of the preceding implementation forms of the first aspect.

The method can be performed by the apparatus according to the first aspect as such or any one of the preceding implementation forms of the first aspect.

The invention can be implemented in hardware and/or software.

BRIEF DESCRIPTION OF THE DRAWINGS

Further embodiments of the invention will be described with respect to the following figures, in which.

DETAILED DESCRIPTION

Figure 1:
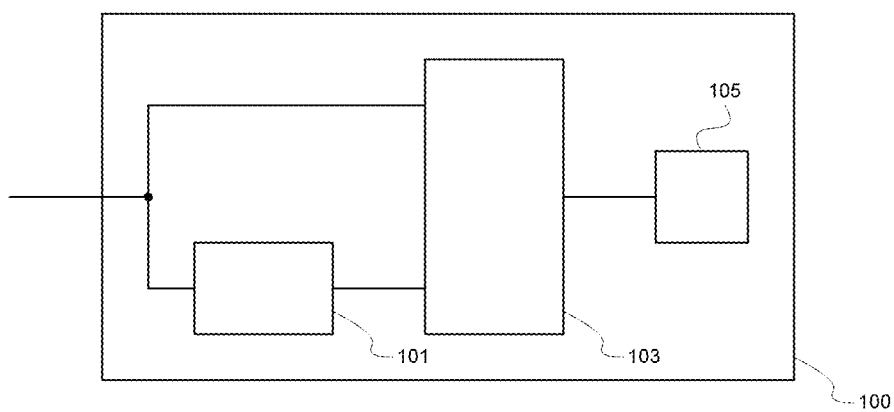
FIG. 1 shows a schematic diagram of an apparatus for characterizing a chromatic dispersion of an optical receive signal.

FIG. 1 shows a schematic diagram of an apparatus 100 for characterizing a chromatic dispersion of an optical receive signal.

The apparatus 100 comprises a delay means 101 for delaying the optical receive signal by a predetermined time delay to obtain a delayed signal, the delayed signal being delayed with respect to the optical receive signal, a phase detecting means 103 for determining a first value indicating a phase delay of the optical receive signal, and for determining a second value indicating a phase delay of the delayed signal, and a processor 105 for determining a chromatic dispersion indicator upon the basis of the first value and the second value, the chromatic dispersion indicator characterizing the chromatic dispersion.

The optical receive signal can be converted to an electrical signal, e.g., by an optical front end. The optical receive signal can be a complex signal comprising an in-phase (I) and a quadrature (Q) component. The optical receive signal can be sampled and/or quantized.

The delayed signal can be a complex signal comprising an in-phase (I) and a quadrature (Q) component. The delayed signal can be sampled and/or quantized.

The predetermined time delay can be, for example, 1 ps, 10 ps, or 100 ps.

The phase delay of the optical receive signal can relate to a sampling phase of the optical receive signal. The first value can be a real number (e.g., 1.3) or a complex number (e.g., 1+j).

The phase delay of the delayed signal can relate to a sampling phase of the delayed signal. The second value can be a real number (e.g., 0.8) or a complex number (e.g., 4−2j).

The chromatic dispersion can relate to a wavelength-dependent propagation of an optical signal in an optical waveguide. The chromatic dispersion indicator can be a real number (e.g., 2.5).

The optical receive signal can be input to the delay means 101 and the phase detecting means 103. The delay means 101 can be connected to the phase detecting means 103. The phase detecting means 103 can be connected to the processor 105.

Figure 2:
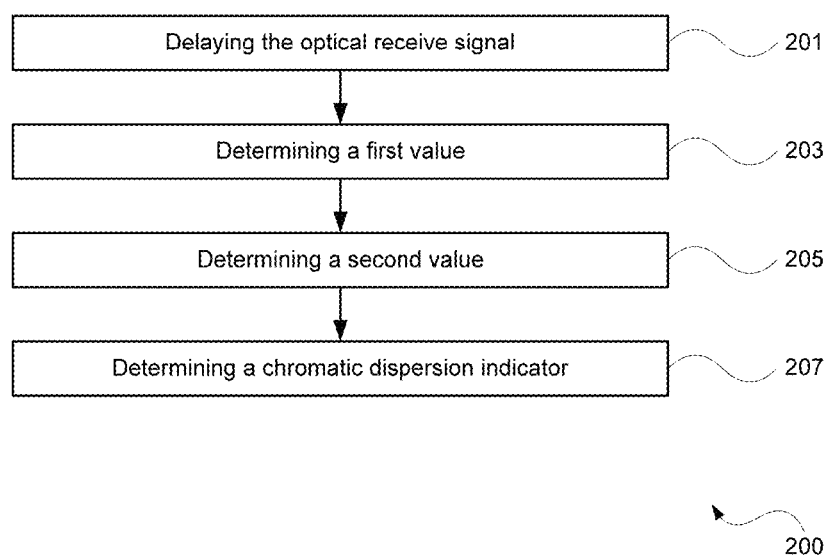
FIG. 2 shows a schematic diagram of a method for characterizing a chromatic dispersion of an optical receive signal.

FIG. 2 shows a schematic diagram of a method 200 for characterizing a chromatic dispersion of an optical receive signal.

The method 200 comprises delaying 201 the optical receive signal by a predetermined time delay to obtain a delayed signal, the delayed signal being delayed with respect to the optical receive signal, determining 203 a first value indicating a phase delay of the optical receive signal, determining 205 a second value indicating a phase delay of the delayed signal, and determining 207 a chromatic dispersion indicator upon the basis of the first value and the second value, the chromatic dispersion indicator characterizing the chromatic dispersion.

Further features of the method 200 can directly result from the functionality of the apparatus 100. The method 200 can be performed by the apparatus 100.

Figure 3:
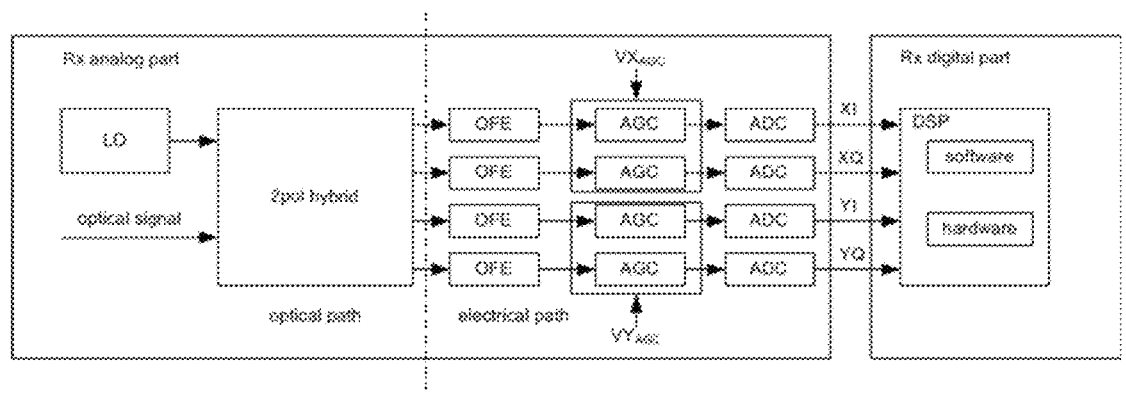
FIG. 3 shows a schematic diagram of a coherent optical receiver.

FIG. 3 shows a schematic diagram of a coherent optical receiver.

Since a digital signal is mapped into both polarizations, a 90° hybrid is used to mix an input signal with a local oscillator (LO) signal that results in four output signals, i.e., two signals per polarization. An optical signal is converted to an electrical signal via an optical front end (OFE) consisting of photo diodes, e.g. a single PIN or balanced, and a trans-impedance amplifier (TIA).

As signal power can vary over time, fast automatic gain control (AGC) blocks can compensate for signal power variations. There are four AGC blocks that can also be an integral part of OFE blocks. Often, due to realization complexity, a pair of AGC blocks is controlled by one control signal, i.e., $VX_{AGC}$ for X polarization and $VY_{AGC}$ for Y polarization. However, four AGC blocks can be controlled by 4 independent control voltages. Signals after AGC blocks are quantized by the use of analog-to-digital converters (ADCs).

Four quantized digital data streams are further processed in a digital signal processing (DSP) block that is divided into two parts, a fast DSP hardware part and a slow DSP software part. In the DSP block, one compensates for chromatic dispersion (CD), polarization mode dispersion (PMD), non-linear effects, LO noise, LO frequency offset, etc. Estimation of slow processes can be done in the software part of the DSP circuit.

Figure 4:
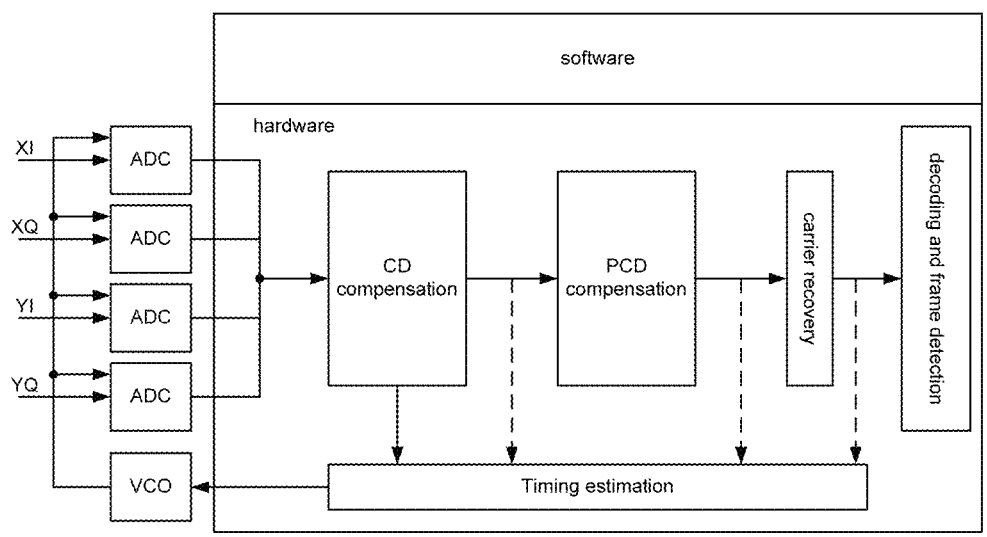
FIG. 4 shows a schematic diagram of basic DSP blocks of a coherent optical receiver.

FIG. 4 shows a schematic diagram of basic DSP blocks of a coherent optical receiver.

After quantization, e.g. by the ADC blocks, four real signals are equalized for chromatic dispersion in the frequency domain using two fast Fourier transformation (FFT) blocks, which can also be done in the time domain.

Polarization tracking, PMD compensation and residual CD compensation are done in time domain using finite impulse response (FIR) filters arranged in butterfly structure, e.g., by a PMD compensation block.

Frequency and phase carrier recovery are done in a carrier recovery block.

Timing estimation can use signal from different places (e.g., within the CD compensation block, by frequency domain timing extraction, after this block, in time domain, or after PMD compensation). CD can be efficiently compensated in the frequency domain (FFT). The compensation CD function can be defined by $$CD^{-1}(DL) = \exp\left(-j\left(\frac{2\pi n f_s}{N}\right)^2 \frac{\lambda_0^2 DL}{4\pi c}\right)$$

where $\lambda_0$ is the signal wavelength, $f_s$ is the sampling frequency, N is the FFT size, c is the speed of light, n is the FFT tap number, L is the fiber length, and D is the dispersion coefficient.

During start-up the first action of coherent receivers after receiving a signal suffering from chromatic dispersion is estimating the amount of a residual CD. Since the receiver can be completely desynchronized, this operation can be done before clock and carrier recovery.

CD estimation can be done using a training sequence. Synchronization, redundancy and estimation time may limit this approach to small CD values.

An estimation method based on clock tone strength measurements can be a promising approach for signal formats having bandwidth larger than Baud rate. This method can be based on a square and filter timing recovery approach that can be realized in the frequency domain. Since the frequency domain CD compensation block is often used, this method can be applied.

A part of this method can be the selection of polarization rotations that should be tested. Using a set of polarization states, some challenging PMD cases can be avoided or solved. Scanning over a predefined CD range using a certain CD step, which can influence precision and estimation time, realized in combination with a few SOPs can provide adequate results.

Figure 5:
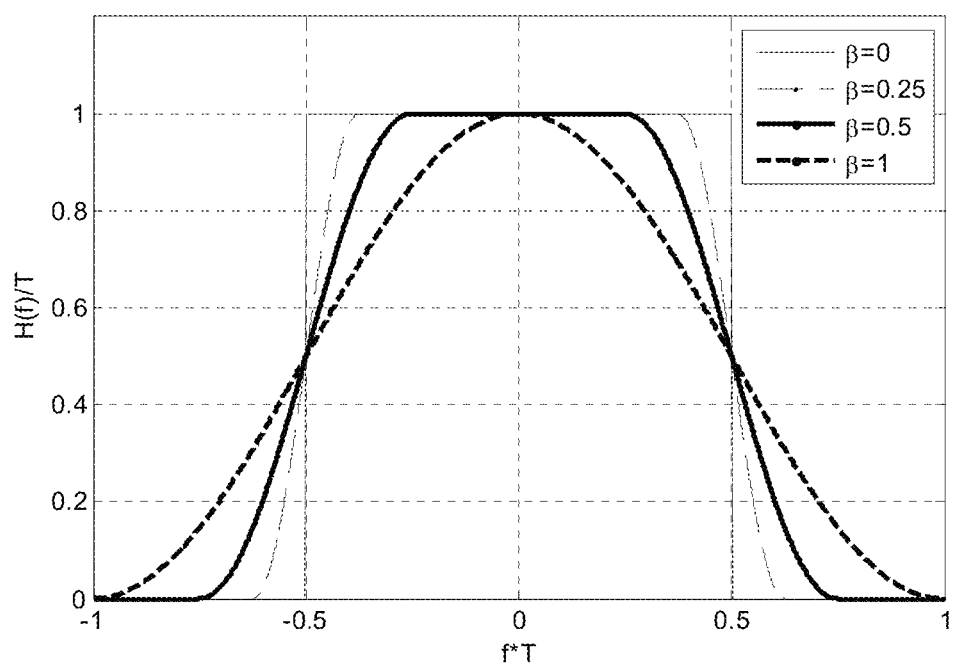
FIG. 5 shows a schematic diagram of a frequency response of a raised-cosine filter with various roll-off factors.

FIG. 5 shows a schematic diagram of a frequency response of a raised-cosine filter with various roll-off factors.

Figure 6:
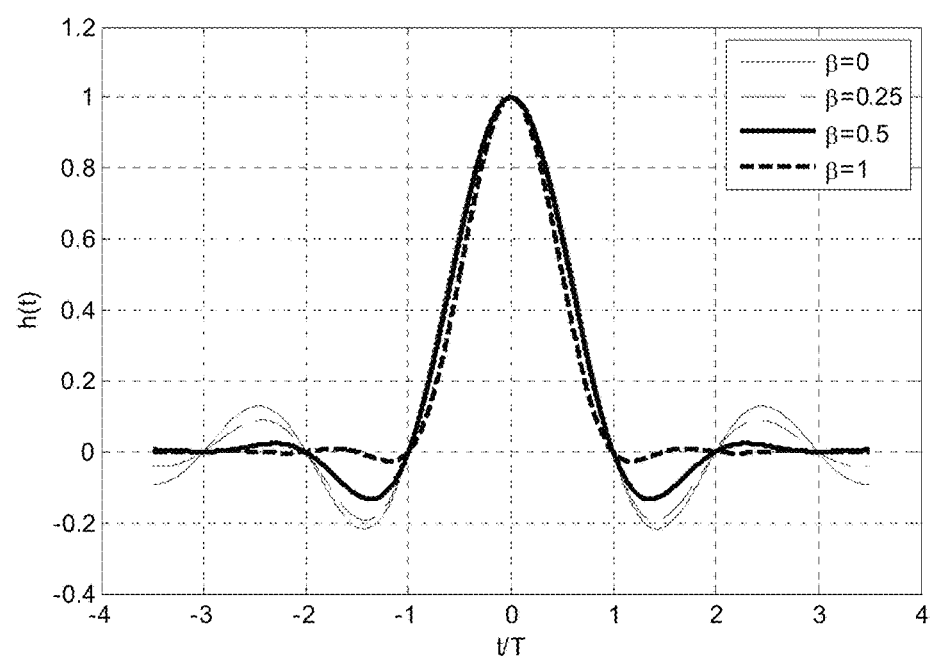
FIG. 6 shows a schematic diagram of an impulse response of a raised-cosine filter with various roll-off factors.

FIG. 6 shows a schematic diagram of an impulse response of a raised-cosine filter with various roll-off factors.

A Nyquist transmission based on Nyquist pulses is used to limit signal bandwidth. This can enable better channel packaging and automatically higher spectral efficiency.

The raised-cosine filter is an implementation of a low-pass Nyquist filter, i.e., one that has the property of vestigial symmetry. This means that its spectrum exhibits odd symmetry about ½T, wherein T is the symbol-period of the communications system. Its frequency-domain description can be given by:

$$H(f) = \begin{cases} T, & |f| \leq \frac{1-\beta}{2T} \\ \frac{T}{2}\left[1 + \cos\left(\frac{\pi T}{\beta}\left[|f| - \frac{1-\beta}{2T}\right]\right)\right], & \frac{1-\beta}{2T} < |f| \leq \frac{1+\beta}{2T} \\ 0, & \text{otherwise} \end{cases} \quad (1)$$

$$0 \leq \beta \leq 1$$

which is characterized by two values: $\beta$, the roll-off factor, and T, the sampling period.

The impulse response of such a filter can be given by:

$$h(t) = sinc\left(\frac{t}{T}\right) \frac{\cos\left(\frac{\pi \beta t}{T}\right)}{1 - \frac{4\beta^2 t^2}{T^2}} \quad (2)$$

in terms of the normalized sinc function. The roll-off factor, $\beta$, is a measure of the excess bandwidth of the filter, i.e., the bandwidth occupied beyond the Nyquist bandwidth of ½T.

The minimum signal bandwidth can be achieved for roll-off factor equal to 0.

Figure 7:
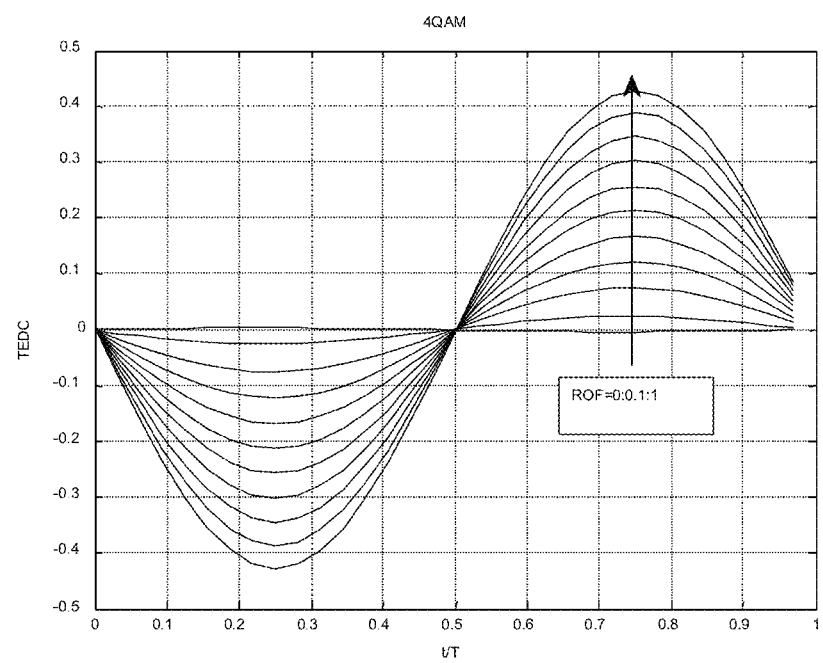
FIG. 7 shows a diagram of an S-curve of a phase detector for various roll-off factors.

FIG. 7 shows a diagram of an S-curve of a phase detector for various roll-off factors. The diagram illustrates a timing error detector characteristic (TEDC) over time for various roll-off factors (ROF). The diagram can relate to QPSK or 4QAM with roll-off factors from 0 to 1 in steps of 0.1.

A decreasing roll-off factor (ROF) can deteriorate or destroy the clock tone quality when the square and filter method is used. The timing error detector characteristic (TEDC) can become very small, which can generate large and uncontrolled jitter. TEDC analysis results for QPSK modulation format at Eb/N0=3 dB show clock tone degradation for small ROF values.

To increase the spectral efficiency, the optical signal can be filtered by an optical filter with a cut-off frequency smaller than Baud frequency. Such systems are called faster than Nyquist (FTN) systems. The square and filter method can fail in these systems.

In narrow-band systems, i.e. Nyquist with small ROF and FTN, the clock recovery can be improved using higher nonlinear operation, e.g., forth power. However, using such timing recovery and method can result in a high complexity, since the CD compensation block cannot be used. Adding a new FFT block only for dispersion estimation can be impractical.

Additionally, after higher nonlinear operations than the squaring the set of SOPs supporting CD estimation can be extremely difficult to find. Even scanning over azimuth, ellipticity and DGD might not provide the answer for the best SOP modification.

Figure 8:
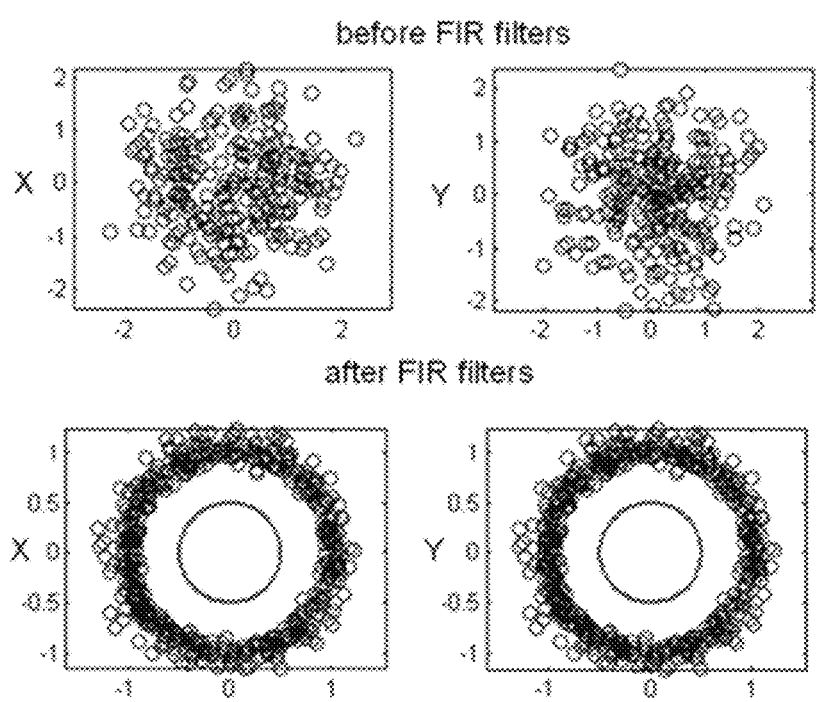
FIG. 8 shows diagrams of signal constellations before and after FIR filters for an X polarization and a Y polarization.

FIG. 8 shows diagrams of signal constellations before and after FIR filters for an X polarization and a Y polarization. The diagrams can relate to a particular CD estimation approach.

Estimating residual dispersion can be done by scanning CD and iterating FIR filter responsible for PMD compensation in a micro-controller. After a FIR filter convergence the number of signals within a cycle is small. A CD value providing the smallest number of points within this cycle can be selected.

The approach can be suitable for PSK modulation format. However, this approach might not be optimized for higher level modulation formats like QAM and for FTN systems, which can be extremely noisy due to inter channel crosstalk and narrow filtering. Using a micro-controller may lead to a long estimation time.

Figure 9:
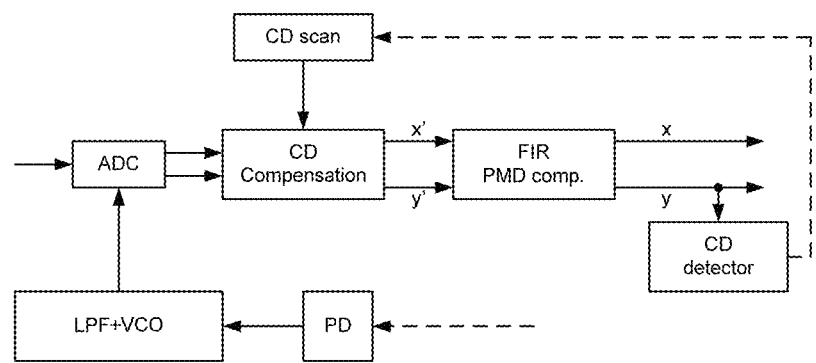
FIG. 9 shows a schematic diagram of CD estimation and compensation blocks.

FIG. 9 shows a schematic diagram of CD estimation and compensation blocks.

During CD estimation the voltage controlled oscillator (VCO) clocking 4 ADCs might not be locked to the incoming data. Later, when the optical link CD value is estimated and compensated, the VCO can get a signal from a phase detector (PD), which can be previously filtered by a low-pass-filter (LPF).

The estimation procedure is done in several steps.

In a first step, based on FIR filter length and baud rate a rough CD scanning step (CDSS1) is defined. In a second step, a CD scanning range is defined from CDmin1 to CDmax1. In a third step, the CD is scanned and each CD detector output value is stored. In a fourth step, a best CD value (CDb) is selected. In a fifth step, a new CD scanning range is defined via CDmin2=CDb−2*CDSS1 and CDmax2=CDb+2*CDSS1. In a sixth step, a smaller scanning step is selected (e.g., CDSS2=100 ps/nm). In a seventh step, the procedure from the first step to the fourth step is repeated. In an eighth step, a best CD value is selected. In a ninth step, a fine CD tuning is done after enabling PD and VCO.

The scanning step CDSS1 value depends on a filter length (FL) and a baud rate (B). For example, for B=28 G and FL=7 a choice for the CDSS1 value can be 500 ps/nm.

A CD scanning range can depend on CD compensation capability, i.e., a maximum link length. To compensate CD in links up to 2000 km with dispersion coefficient of 17 ps/nm/km, i.e., positive dispersion, the maximum expected CD value is 34000 ps/nm. In this case, the scanning range can be defined via CDmin1=−2000 ps/nm and CDmax1=36000 ps/nm.

Figure 10:
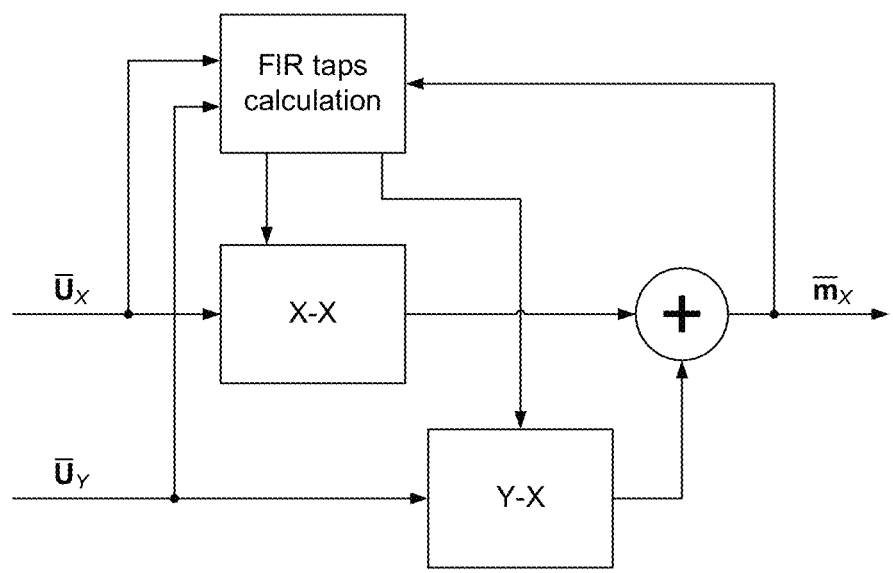
FIG. 10 shows a schematic diagram of an FIR filter for an X polarization.

FIG. 10 shows a schematic diagram of an FIR filter for an X polarization.

A CD detector can output a value related to the specific CD. The maximum value indicates a link CD. FIR filter taps are updated using a constant modulus algorithm. An oversampled system with two samples per symbol, i.e. samples A and B, is assumed. Two-fold oversampling can speed up convergence and can relax DSP algorithms. A CMA algorithm forces the first sample (A) onto the unit circle. FIR taps are updated using the following equation:

$$\overline{W}_{k+1} = (1-\alpha)\overline{W}_k + \mu e_k \overline{m}_k^* \overline{U}_k$$

$$e_k = 1 - |\overline{m}_k|^2$$

where μ is an update coefficient, α is a leakage factor, and * denotes conjugate complex. The error $e_k$ is calculated using A samples. This method can be efficient in PSK systems and it can also provide sub-optimum performance in QAM systems.

In this approach the FIR filter outputs two samples per symbol.

Figure 11:
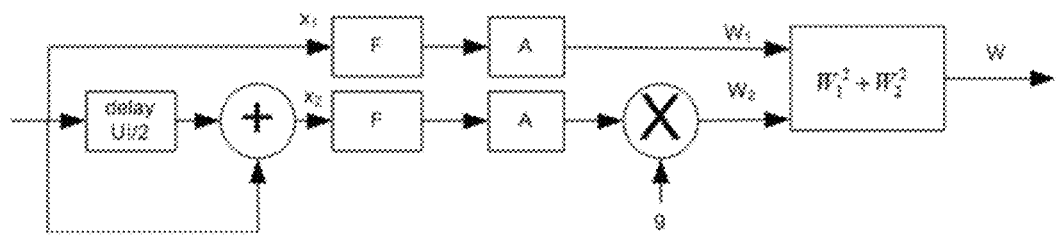
FIG. 11 shows a schematic diagram of a CD detector.

FIG. 11 shows a schematic diagram of a CD detector.

The CD detector uses two samples per symbol from one polarization. It can also use samples from both polarizations, which may shorten an estimation time. In general, the signal is complex. The signal $x_2$ is the sum of the previous and current sample. The block denoted by F outputs the signal:

$$y = x(n)x^*(n-1)$$

The block A operates with three samples, e.g. a Gardner phase detector, and outputs:

$$y = \text{real}(x(n)^*(x(n+1)-x(n-1)))$$

The lower branch is multiplied by $$g = \frac{1}{8}\sqrt{\frac{\pi}{2+\pi}}$$

The detector output is $W = W_1^2 + W_2^2$.

Since the VCO might not be locked to the incoming signal, a clock offset of, for example, 100 ppm, causes a sampling phase drift of one unit interval (UI) in 10000 symbols. Therefore, the FIR filter updating algorithm (CMA) with continuous sample stream might not converge. A solution of this problem can be to use a short block of data and to update FIR taps by iterating several times the same block. However, statistics of data together with channel impairments, e.g., noise, in one block might result in a very bad acquisition. To solve this problem more blocks are desired.

The estimation procedure related to the fixed CD value is the following.

In a first step, define the length of a data block in symbols K; if the maximum clock offset is 100 ppm, the sampling phase shift of 0.1 UI happens in 1000 symbols; this might have only small influence on the CMA procedure.

In a second step, define the number of iterations M. this can depend on the desired estimation time. Since CMA can have a slow convergence more iterations can be desirable. A good choice can be, for example, 80.

In a third step, define a number of data blocks N. Again it can depend on the desired estimation time. A good choice can be, for example, 20.

In a fourth step, define update coefficient values for each iteration; this can be important for accelerating CMA and to get finer results, a good choice can be to select $M=2^m$ and m iteration regions IR; if a starting value is $\mu(1)=\mu_0$ then $$\mu(k) = \frac{\mu_0}{2^{k-1}}; k = 1:m$$

$$IR(k) = M\left(1 - \frac{1}{2^{k-1}}\right) + 1 : M\left(1 - \frac{1}{2^k}\right); k = 1:m-1$$

$$IR(m) = M\left(1 - \frac{1}{2^{k-1}}\right) + 1 : M.$$

Figure 12:
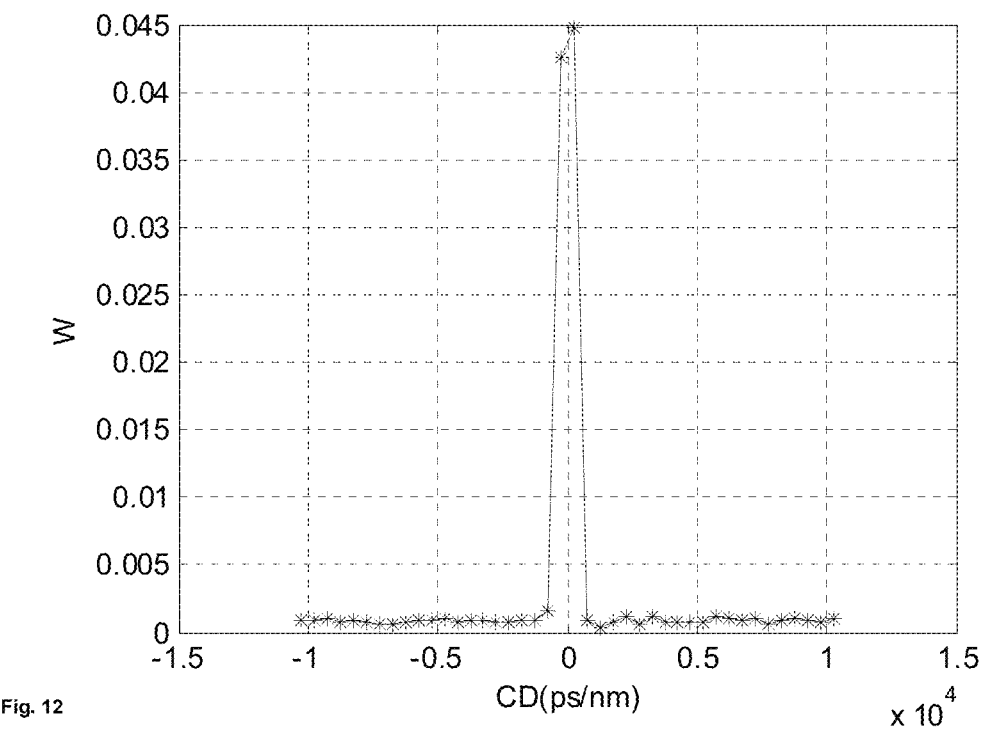
FIG. 12 shows a diagram of a CD detector output for coarse CD scanning.

FIG. 12 shows a diagram of a CD detector output for coarse CD scanning. The diagram can also relate to a BER performance.

Figure 13:
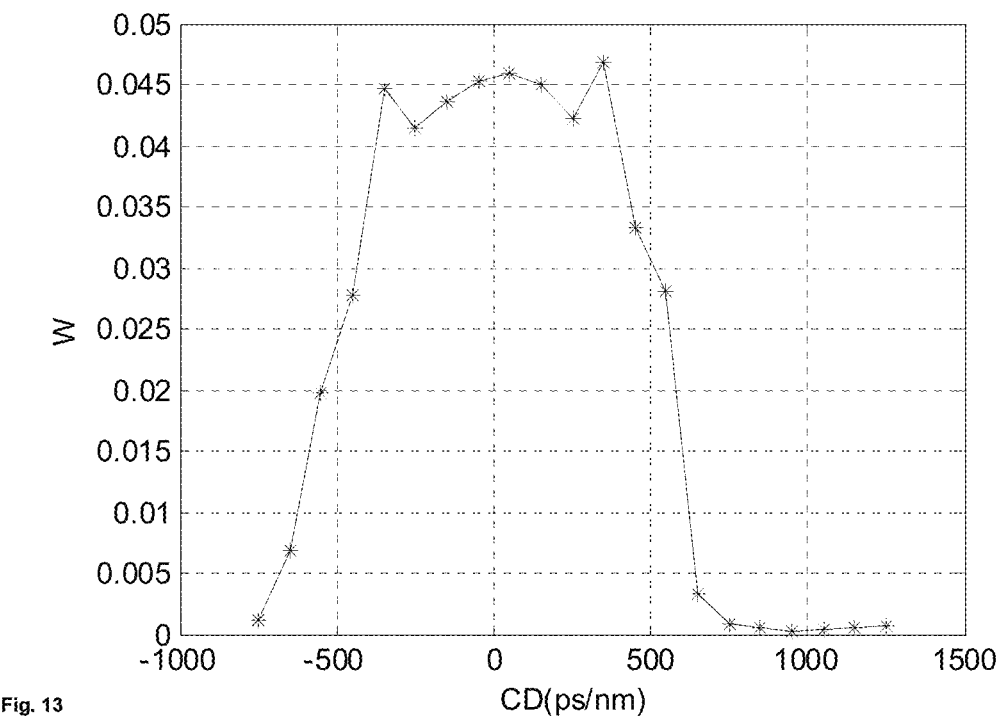
FIG. 13 shows a diagram of a CD detector output for fine CD scanning.

FIG. 13 shows a diagram of a CD detector output for fine CD scanning. The diagram can also relate to a BER performance.

One can analyze a 28 GB/s dual polarization QPSK transmission with high order PMD under the worst estimation scenario, which will be explained later. The CD value can be set to 0 ps/nm. The scanning step is 500 ps/nm and a FIR filter length is 7. The best estimated CD value is 250 ps/nm. The new scanning range is set from −750 to 1250 ps/nm with the scanning step of 100 ps/nm. To estimate the CD, one can use the following equation:

$$CDest = \sum_{k=1}^{N} CD(k) \frac{W(k)}{\sum_{m=1}^{N} W(m)} \quad (3)$$

where CD(k) is a k-th tested value and N is the number of tested values. In this example, the estimated value obtained using Eq. (3) is 17 ps/nm. The estimation error can be practically negligible.

Figure 14:
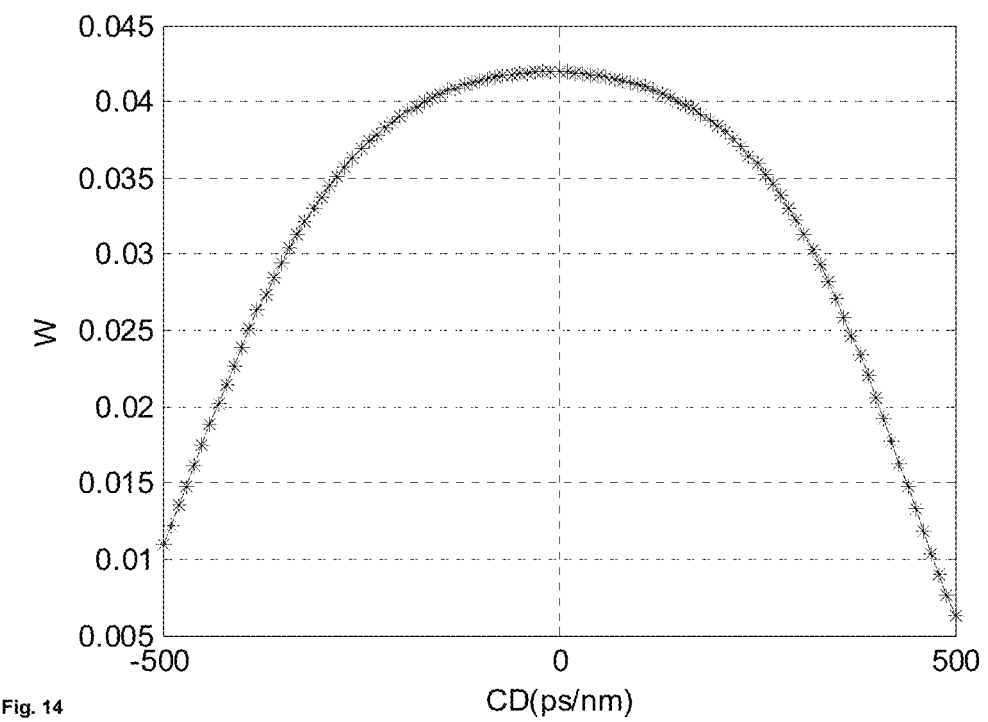
FIG. 14 shows a diagram of a CD detector output after VCO locking.

FIG. 14 shows a diagram of a CD detector output after VCO locking. The diagram illustrates an estimation improvement for CD scanning after VCO locking with a scanning step size of 10 ps/nm.

After setting a CD value from the previous example to 17 ps/nm one can enable the PD and VCO. The clock can then be synchronized and the FIR filter can converge. The scanning is done slowly in steps of 10 ps/nm on both CD sides. The scanning is stopped when W values drop for more than x % on both sides. This scanning might not noticeably deteriorate BER performance. The FIR filter with 7 taps can tolerate CD of a few hundreds ps/nm. Using Eq. (3), one obtains the CD correction value of −10 ps/nm. After this step, the residual error is 7 ps/nm.

Figure 15:
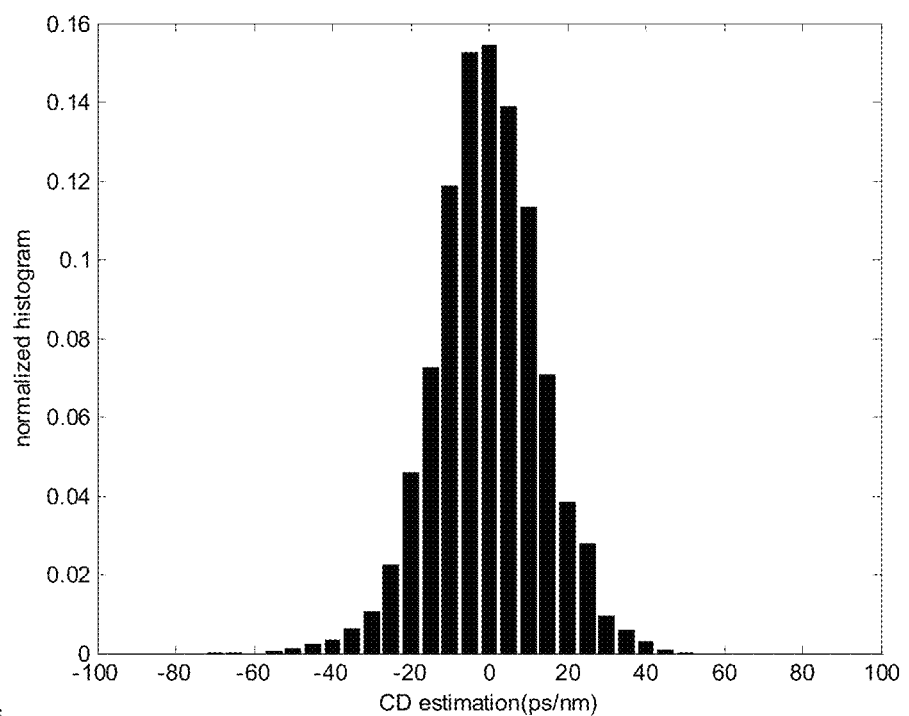
FIG. 15 shows a normalized histogram of CD estimation values.

FIG. 15 shows a normalized histogram of CD estimation values.

One can test the algorithm at, for example, CD=0 ps/nm, where the CD value depends on the CD compensation module capability and can be chosen as any value.

The following parameters can further be chosen: dual polarization 28 GB/s transmission; modulation format comprising QPSK with OSNR=14 dB, or 16QAM with OSNR=21 dB; PMD comprising no PMD, or high order PMD with mean DGD of 25 ps; ROF comprising 0 or 0.5; and transmitter Gaussian optical filter of 4th order with cut-off frequency of 22 GHz for FTN, OSNR can be higher for 2 dB, or 45 GHz.

The estimation algorithm can be executed under these circumstances, e.g., an extreme case: clock offset of 100 ppm; sinusoidal jitter with amplitude 1 UIpp, frequency 5 MHz; SOP rotation of 30 kHz; SOP can be additionally randomly rotated at each testing CD value, i.e., azimuth and ellipticity can be set randomly; and each block of data entering FIR filter has a random starting sampling phase.

One can analyze 1000 different channel and estimation conditions for each of the 16 cases previously listed. The maximum absolute estimation error is 68 ps/nm. Doubling the number of iterations decreases the estimation error almost twice. Enabling clock recovery, i.e., after enabling PD and VCO, and fine CD tuning, i.e., 1 million symbols per CD value, brings the estimation error to a few ps/nm. Instead of the clock quality, which is the function W, one can use the FEC information, which is the number of corrected errors, or an error vector magnitude and one can do an estimation replacing W by one of these parameters in Eq. (3).

Figure 16:
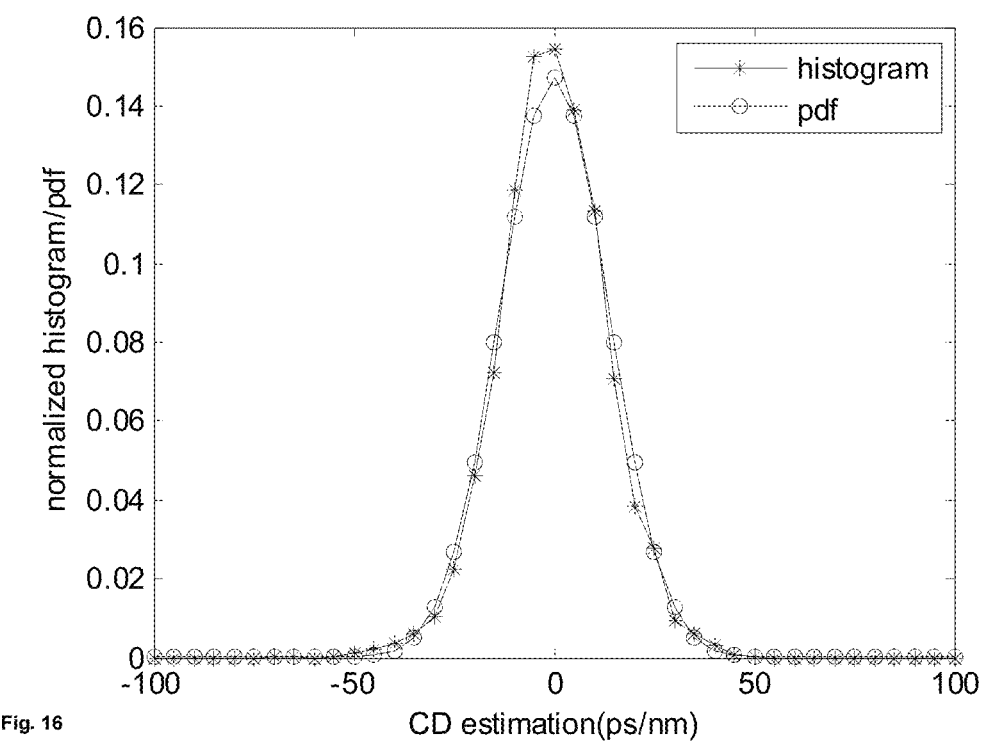
FIG. 16 shows a normalized histogram and a probability density function of CD estimation values.

FIG. 16 shows a normalized histogram and a probability density function of CD estimation values. A Gaussian fitting can be applied to the normalized histogram.

One can fit the above estimation error histogram by a Gaussian distribution. The estimation error is well fitted by a normal distribution that can be used to predict large estimation errors.

Figure 17:
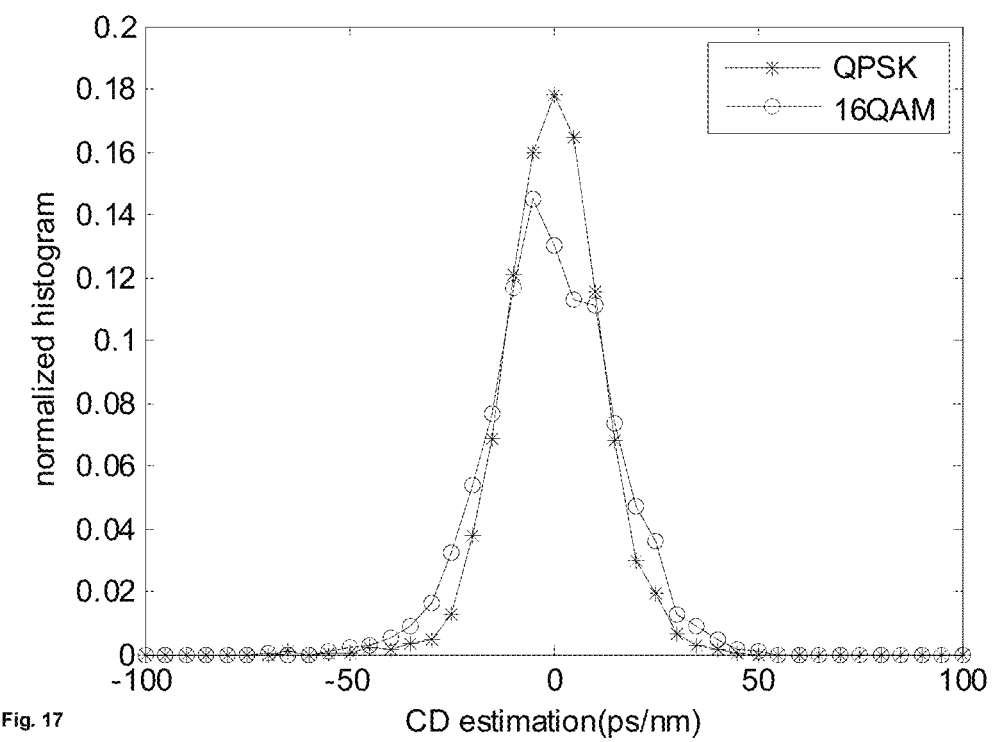
FIG. 17 shows a normalized histogram of CD estimation values for a QPSK and 16QAM modulation format.

FIG. 17 shows a normalized histogram of CD estimation values for a QPSK and 16QAM modulation format. The normalized histogram can relate to an error distribution.

QPSK and 16QAM can provide similar error distributions and standard deviations, i.e., QPSK—12 ps/nm and 16QAM—16 ps/nm. This shows that the estimation method does not strongly depend on a modulation format. This is in the nature of the estimation procedure relying on the clock tone. Clock tone extraction, i.e., by using a phase detector, can be less sensitive to modulation formats. Increasing the number of constellation points can introduce a larger estimation error, which can be decreased using more iteration steps or data blocks.

Figure 18:
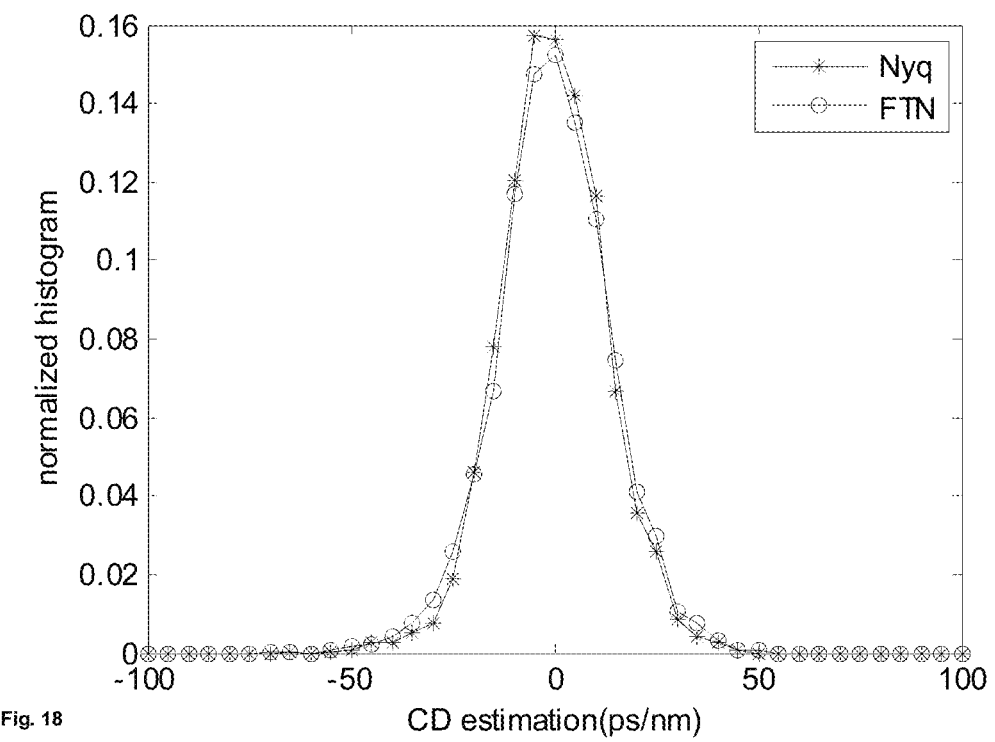
FIG. 18 shows a normalized histogram of CD estimation values for a Nyquist and FTN signal transmission system.

FIG. 18 shows a normalized histogram of CD estimation values for a Nyquist and FTN signal transmission system. The normalized histogram can relate to an estimation error.

The bandwidth of the optical filter, which is supposed to be 45 GHz and 22 GHz, might not influence the estimation accuracy. The standard deviation and histogram shapes are almost identical in both cases. Results with 22 GHz are called faster than Nyquist (FTN).

Figure 19:
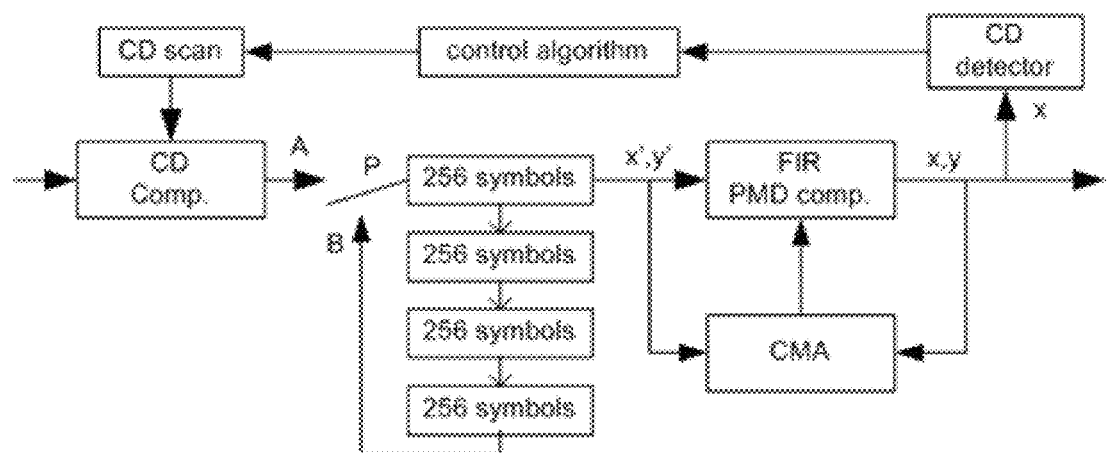
FIG. 19 shows a schematic diagram of a parallel implementation of CD estimation blocks.

FIG. 19 shows a schematic diagram of a parallel implementation of CD estimation blocks.

At high baud rates like 28 G, the DSP processing can be implemented to process parallel data at much lower frequencies. A CMOS ASIC clock may be decreased to be in range of 100 MHz. For example, parallelization of n=256 symbols may result in a 28e9/256=109.375 MHz DSP clock. The FIR filter can also be realized by the use of 256 filters. At the same time 256 symbols can be processed, wherein the number of 256 is used as an example for better illustration.

One can assign values K=m*n=4*256, i.e. basic data block length in symbols, N=10, i.e., number of data blocks, and M=80 number of FIR updates, i.e., iterations. The control algorithm block takes care of the CD scanning. After a coarse scanning the CD detector provides the best estimation and the control algorithm sets the new scanning range and step. After the second scanning the control block receives the best CD estimated value. This value is used in the compensation block. Then, the receiver enables all other DSP blocks as e.g., timing recovery and carrier recovery.

To estimate the CD value, 3 additional buffers can be desirable to store the complete basic data block of 1024 symbols. In the beginning, the switch P can be in the position A. When the buffer is full, the FIR and CMA can be on, e.g. P is in the position B. A CMA update is enabled after one cycle of buffer data. After 80 iterations of buffered data the CD detector stores the estimation result. The next data block is loaded from the CD compensator and the same procedure is repeated for all blocks.

Figure 20:
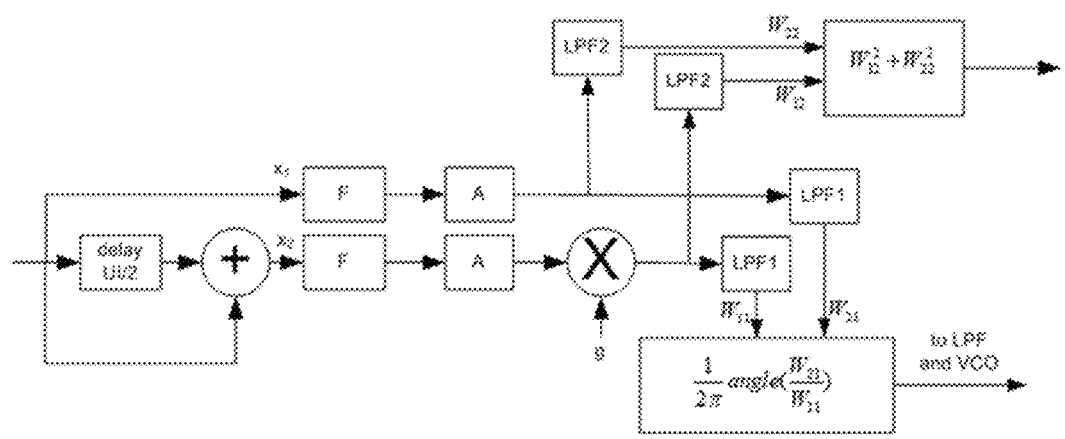
FIG. 20 shows a schematic diagram of a CD detector as a part of a phase detector.

FIG. 20 shows a schematic diagram of a CD detector as a part of a phase detector.

The CD estimator can be a part of a phase detector, so that the complexity of the CD estimator is negligible. Only a squaring of signals $W_1$ and $W_2$ is necessary per 4 CMOS clocks in the previous example, if addition is neglected. The realization of Eq. (3) can be trivial and can be done at much lower speed at the end of the complete estimation.

Excluding the CD detector, the additional complexity of the estimation approach is storage place of 3*256 symbols and some control algorithms, which might not be used in uninterrupted data processing.

Figure 21:
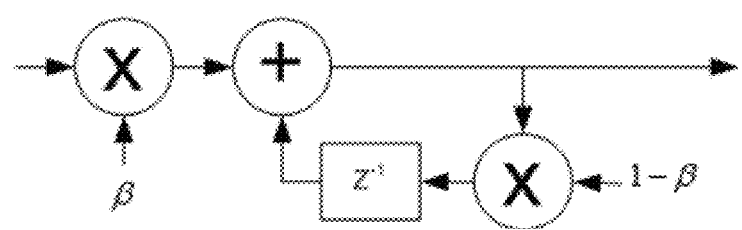
FIG. 21 shows a schematic diagram of a low-pass filter.

FIG. 21 shows a schematic diagram of a low-pass filter. The low-pass filter can be applied e.g., as LPF1 filter.

Figure 22:
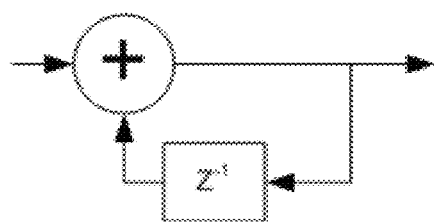
FIG. 22 shows a schematic diagram of a low-pass filter.

FIG. 22 shows a schematic diagram of a low-pass filter. The low-pass filter can be applied e.g., as LPF2 filter.

The low-pass filter LPF1 can have a simple IIR structure. LPF1 can be enabled after setting the correct CD. This filter can be a part of a phase detector responsible for clock extraction.

The low-pass filter LPF2 can have a simple IIR structure. LPF2 can be an accumulator that is restarted after every 4 blocks of 256 symbols in the example above. This filter and the CD detector might be used only after the last FIR filter update.

In an implementation form, the invention relates to estimation of chromatic dispersion in Nyquist systems and systems faster than Nyquist.

In an implementation form, the invention relates to estimation of chromatic dispersion in non-Nyquist systems and systems non-faster than Nyquist.

In an implementation form, the invention relates to a method for residual chromatic dispersion estimation in Nyquist systems and systems faster than Nyquist.

In an implementation form, the invention relates to a method for residual chromatic dispersion estimation in non-Nyquist systems and systems non-faster than Nyquist.

In an implementation form, the invention relates to coherent optical receivers using enhanced digital signal processing including chromatic dispersion compensation.

In an implementation form, the invention relates to a method which enables an accurate CD estimation independent of the modulation format.

In an implementation form, the invention relates to a method which estimates the residual CD without clock synchronization.

In an implementation form, the invention relates to an estimation method which is insensitive to channel impairments, like PMD and/or SOP variations.

In an implementation form, the invention relates to a method which uses clock recovery resources and can be realized with very low complexity.

In an implementation form, the invention relates to a method for chromatic dispersion estimation in extremely bandlimited systems, even in systems with bandwidths smaller than the baud rate.

In an implementation form, the invention relates to a fast CD estimation method realized in CMOS ASIC at high processing speed that exploits clock recovery resources.

What is claimed is:

1. An apparatus for characterizing a chromatic dispersion of an optical receive signal comprising communication symbols, the apparatus comprising:
 a delay circuit configured to delay the optical receive signal by a half of a communication symbol time to obtain an auxiliary signal;
 an adder configured to add the auxiliary signal to the optical receive signal to obtain the delayed signal;
 a phase detector configured to determine a first value indicating a phase delay of the optical receive signal, and determine a second value indicating a phase delay of the delayed signal; and
 a processor configured to determine a chromatic dispersion indicator upon the basis of the first value and the second value, the chromatic dispersion indicator characterizing the chromatic dispersion.

2. The apparatus according to claim 1, wherein the phase detector comprises:
 a first phase detector configured to determine the first value indicating the phase delay of the optical receive signal; and
 a second phase detector configured to determine the second value indicating the phase delay of the delayed signal.

3. The apparatus according to claim 1, wherein the communication symbols are oversampled by a predetermined oversampling factor.

4. The apparatus according to claim 1, wherein the phase detector is configured to widen the spectrum of the optical receive signal or the delayed signal.

5. The apparatus according to claim 4, wherein the phase detector is configured to widen the spectrum of the optical receive signal or the delayed signal according to the following equation:

$$y=x(n)x^*(n-1)$$

wherein x denotes the optical receive signal or the delayed signal in time domain, n denotes a sample index, (*) denotes complex conjugate, and y denotes the spectrum widened signal.

6. The apparatus according to claim 1, wherein the phase detector is configured to recover a sampling phase of the optical receive signal or of the delayed signal to determine the first value or the second value.

7. The apparatus according to claim 6, wherein the phase detector is configured to determine the first value or the second value according to the following equation:

$$y=\mathrm{real}(x(n)^*(x(n+1)-x(n-1)))$$

wherein x denotes the optical receive signal or the delayed signal in time domain, n denotes a sample index, (*) denotes complex conjugate, real(•) denotes the real part of a complex number, and y denotes the first value or the second value.

8. The apparatus according to claim 1, wherein the processor is configured to weight the first value or the second value by a predetermined weighting factor.

9. The apparatus according to claim 8, wherein the processor is configured to weight the first value or the second value by a predetermined weighting factor g given by:

$$g = \frac{1}{8}\sqrt{\frac{\pi}{2+\pi}}.$$

10. The apparatus according to claim 1, wherein:
 the processor comprises a low-pass filter and is configured to provide the first value or the second value to the low-pass filter.

11. The apparatus according to claim 10, wherein:
 the processor comprises a low-pass filter and is configured to provide the first value or the second value to the low-pass filter, wherein the low-pass filter is an integrator or a weighted integrator.

12. The apparatus according to claim 1, wherein the processor is configured to determine the chromatic dispersion indicator according to the following equation:

$$W=W_1^2+W_2^2$$

wherein $W_1$ denotes the first value, $W_2$ denotes the second value, and W denotes the chromatic dispersion indicator.

13. A method for characterizing a chromatic dispersion of an optical receive signal comprising communication symbols, the method comprising:
   delaying the optical receive signal by a half of a communication symbol time to obtain an auxiliary signal;
   adding the auxiliary signal to the optical receive signal to obtain a delayed signal;
   determining a first value indicating a phase delay of the optical receive signal;
   determining a second value indicating a phase delay of the delayed signal; and
   determining a chromatic dispersion indicator upon the basis of the first value and the second value, the chromatic dispersion indicator characterizing the chromatic dispersion.

14. A method for characterizing a chromatic dispersion of an optical receive signal, the method comprising:
   delaying the optical receive signal by a predetermined time delay to obtain a delayed signal, the delayed signal being delayed with respect to the optical receive signal;
   determining a first value indicating a phase delay of the optical receive signal;
   determining a second value indicating a phase delay of the delayed signal;
   widening the spectrum of the optical receive signal or the delayed signal according to the following equation:

$$y=x(n)x^*(n-1)$$

wherein x denotes the optical receive signal or the delayed signal in time domain, n denotes a sample index, (*) denotes complex conjugate, and y denotes the spectrum widened signal; and
   determining a chromatic dispersion indicator upon the basis of the first value and the second value, the chromatic dispersion indicator characterizing the chromatic dispersion.

* * * * *